United States Patent
Ohtsuki et al.

[11] Patent Number: 6,078,598
[45] Date of Patent: Jun. 20, 2000

[54] LASER APPARATUS, PULSED LASER OSCILLATION METHOD AND PROJECTION EXPOSURE APPARATUS USING THE SAME

[75] Inventors: Tomoko Ohtsuki; Soichi Owa, both of Tokyo, Japan

[73] Assignee: Nikon Corporation, Tokyo, Japan

[21] Appl. No.: 09/065,420

[22] Filed: Apr. 24, 1998

[30] Foreign Application Priority Data

Apr. 25, 1997 [JP] Japan ................................. 9-109747

[51] Int. Cl.[7] ............................................. H01S 3/11
[52] U.S. Cl. ............................ 372/12; 372/97; 372/92; 372/98; 372/34; 372/27; 372/22
[58] Field of Search ............................. 372/10, 22, 92, 372/27, 98, 21, 12, 11, 34

[56] References Cited

U.S. PATENT DOCUMENTS

| | | | |
|---|---|---|---|
| 3,609,586 | 9/1971 | Danielmeyer | 372/21 |
| 3,648,193 | 3/1972 | Foster et al. | 372/22 |
| 3,774,120 | 11/1973 | Ross | 372/21 |
| 4,181,899 | 1/1980 | Liu | 372/34 |
| 4,660,206 | 4/1987 | Halmos et al. | 372/12 |
| 4,982,405 | 1/1991 | Zayhowski et al. | 372/10 |
| 5,029,816 | 7/1991 | Boczar | 372/21 |
| 5,048,051 | 9/1991 | Zayhowski | 372/101 |
| 5,172,391 | 12/1992 | Zayhowski | 372/27 |
| 5,381,431 | 1/1995 | Zayhowski | 372/10 |
| 5,388,114 | 2/1995 | Zarrabi et al. | 372/22 |
| 5,488,619 | 1/1996 | Injeyan et al. | 372/12 |
| 5,832,010 | 11/1998 | Fulbert et al. | 372/22 |
| 5,838,709 | 11/1998 | Owa | 372/22 |
| 5,870,421 | 2/1999 | Dahm | 372/98 |

OTHER PUBLICATIONS

J.J. Zayhowski and C. Dill III; "Optics Letters", Diode–pumped microchip lasers electro–optically Q switched at high pulse repetition rates; vol. 17, No. 17, pp. 1201–1203, Sep. 1, 1992.

Primary Examiner—Leon Scott, Jr.
Attorney, Agent, or Firm—Morgan, Lewis & Bockius LLP

[57] ABSTRACT

A laser apparatus includes a laser resonator having a first reflective surface and a second reflective surface, the laser resonator further including a laser medium disposed between the first reflective surface and the second reflective surface for processing light reflected from the first and second reflective surfaces to output a laser beam to be resonated, and a resonator loss varying unit disposed between the first reflective surface and the second reflective surface of the laser resonator, the resonator loss varying unit being capable of switching a state thereof between a first state having a resonance frequency substantially coinciding with one of frequencies at which laser oscillation of the laser resonator is possible and a second state having the resonance frequency shifted to the value that is substantially different from any one of the frequencies at which laser oscillation of the laser resonator is possible to vary a loss of the laser resonator.

14 Claims, 6 Drawing Sheets

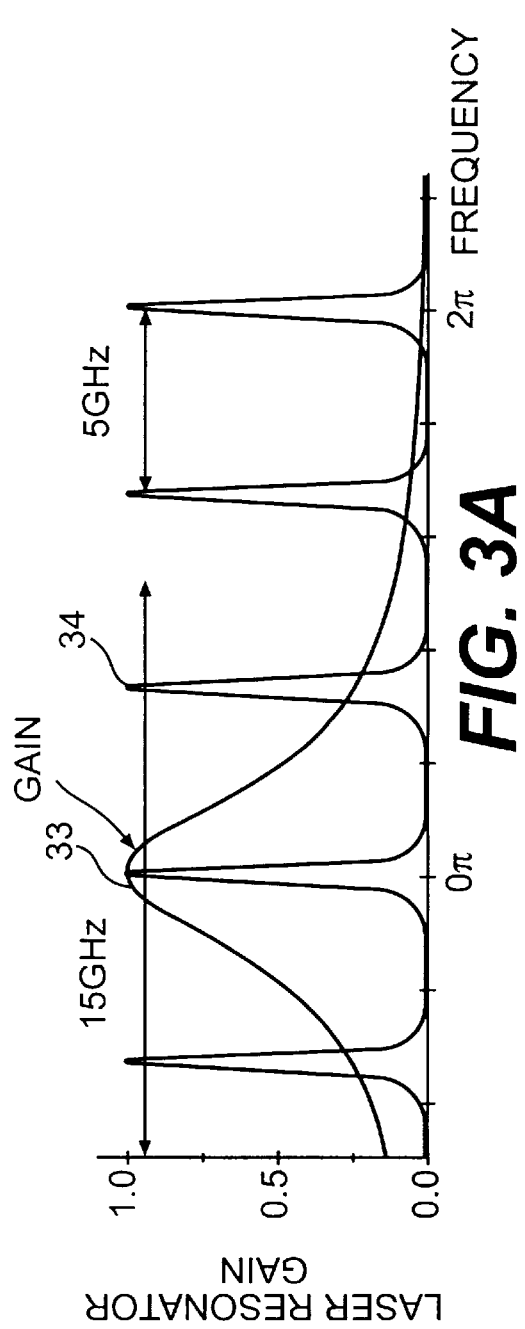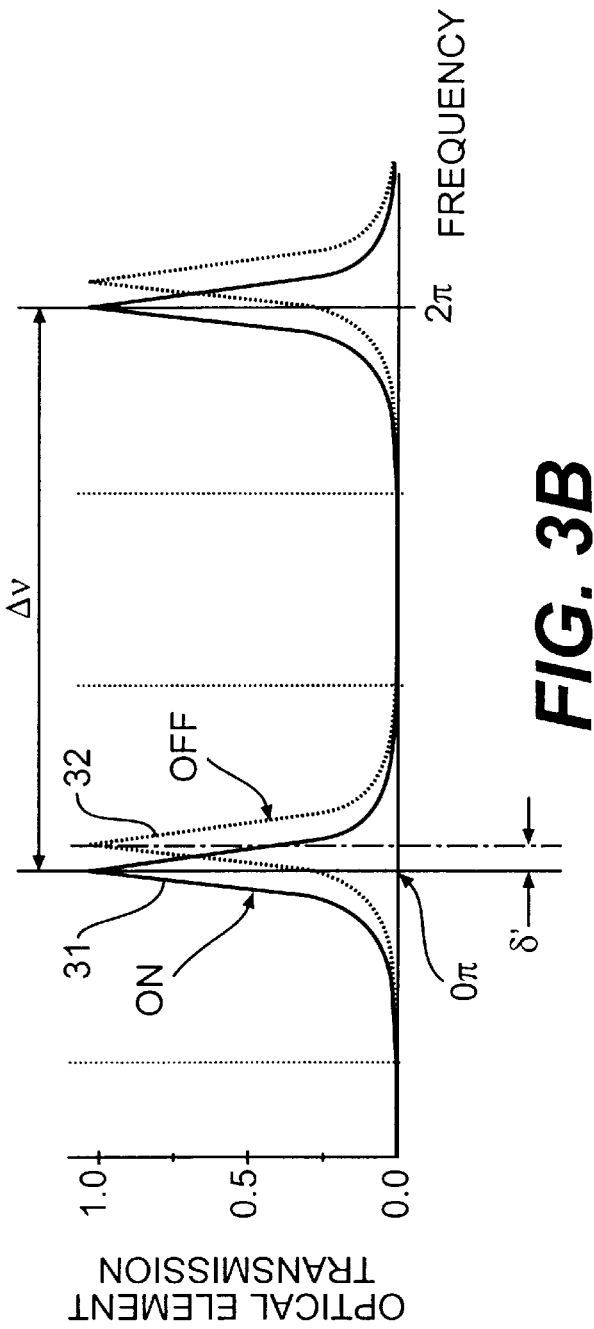

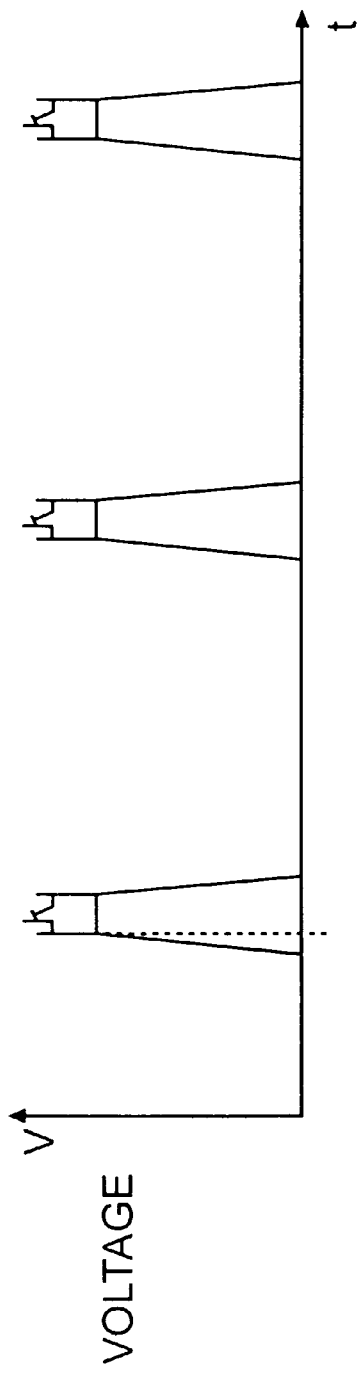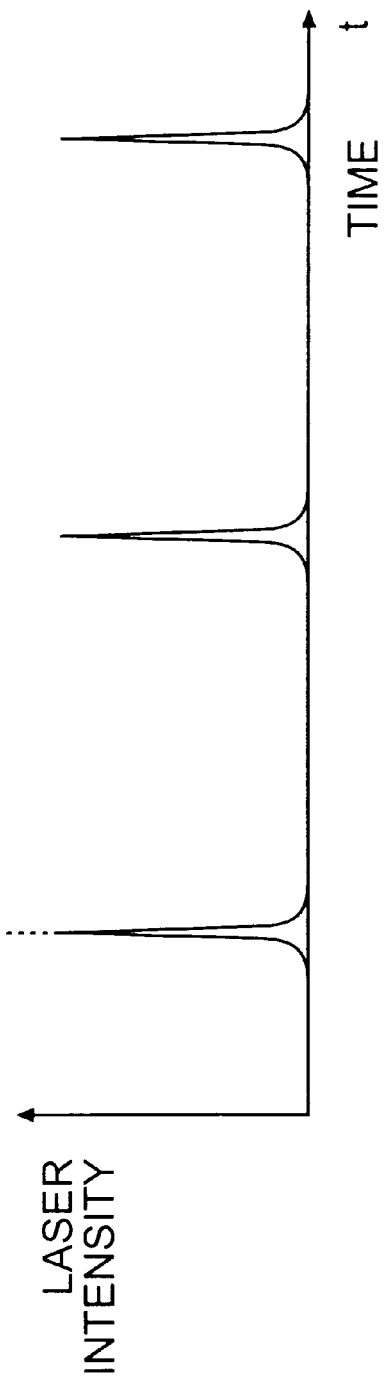

LASER APPARATUS, PULSED LASER OSCILLATION METHOD AND PROJECTION EXPOSURE APPARATUS USING THE SAME

This application claims the benefit of Japanese Application No. 09-109747, filed in Japan on Apr. 25, 1997, which is hereby incorporated by reference.

BACKGROUND OF THE INVENTION

1. Field of the Invention

The present invention relates to a laser apparatus for emitting pulsed laser beams, and more particularly, to a Q-switch optical element of a laser resonator for generating pulsed laser oscillation.

2. Discussion of the Related Art

In laser technology, a Q-switching device has been used to generate high power pulsed laser outputs. The Q-switching device controls the energy loss in the laser resonator. When the energy loss in the laser resonator becomes small (i.e., when the Q value becomes large), a laser pulse is emitted from the laser apparatus. Examples of optical elements that can be used as the Q-switching device include rotating mirrors, acoustic-optical elements (AO elements), and electrooptic elements (EO elements: electrooptic crystals).

However, rotating mirrors and acoustic-optical elements generally suffer from a drawback of having slow switching rates in changing the energy loss inside the resonator. Accordingly, in a high-gain laser apparatus and in a laser apparatus that requires a short pulse width, an electrooptic element having a high switching speed is employed as the Q switching device.

An example of the laser apparatus having such an electrooptic element as a Q switching device is described with reference to FIG. 7. This laser apparatus is equipped with a pumping light source (not shown in the figures) for emitting pumping light 75, a laser medium 71, and an output mirror 74. A reflective film 711 is coated on the light incident surface of the laser medium 71 on which the pumping light is incident. The reflective film 711 transmits light in the wavelength band corresponding to the pumping light and reflects light in the wavelength band corresponding to the laser light reflected from the output mirror 74. As a result, a laser resonator is constructed of the output mirror 74 and the reflective film 711 of the laser medium 71.

An electrooptic element 72 and a polarizer 73 are installed in the laser resonator as a Q-switching device. The refractive index of the crystal in the electrooptic element 72 varies depending on the voltage applied thereto. For example, when no voltage is applied, the electrooptic element 72 functions as a half-wave plate, and when an appropriate voltage is applied, it functions as a full-wave plate. Thus, by controlling the applied voltage, the electrooptic element can be used as a variable wave plate.

The polarizer 73 transmits P-polarized light and reflects S-polarized light towards the outside of the laser resonator. When the electrooptic element 72 is in the state of a half-wave plate, the polarization direction of light incident on the electrooptic element 72 is rotated by 90 degrees. Thus, almost all the light that has passed through the electrooptic element 72 is reflected at the polarizer 73 towards the outside of the laser resonator. Therefore, the energy loss in the resonator increases significantly. On the other hand, when the applied voltage changes such that the electrooptic element 72 assumes the state of a full-wave plate, the polarization direction of light incident on the electrooptic element 72 receives no changes. Therefore, the light from the electrooptic element 72 can pass through the polarizer 73, and the energy loss in the laser resonator is reduced. Accordingly, a pulsed laser beam 76 is emitted from the laser resonator. In other words, pulsed laser oscillation is achieved by varying the energy loss of the laser resonator using the electrooptic element 72 and polarizer 73.

Materials that can be used for the electrooptic element include $LiNbO_3$, KDP ($KH_2PO_4$) and $LiTaO_3$. Usually, the applied voltage needs to be as high as several kilovolts.

Since KDP is a deliquescent substance, it is necessary to package KDP so as not to contact air. Accordingly, miniaturization of the apparatus is difficult. Furthermore, due to material deformation of the piezo-effect, $LiNbO_3$ cannot be used at a high switching speed.

When the Q-switching device is constructed of an electrooptic element and a polarizer, as described above, a power supply capable of generating high voltages is required to drive the electrooptic element. However, it is extremely difficult to construct a power supply that can generate such high voltage pulses of several kilovolts at a repetition rate of 1 kHz or faster. Thus, it is difficult to realize such a system for high-frequency switching.

SUMMARY OF THE INVENTION

Accordingly, the present invention is directed to a laser apparatus, pulsed laser oscillation method and a projection exposure apparatus using the same that substantially obviate the problems due to limitations and disadvantages of the related art.

An object of the present invention is to provide a laser apparatus having a new type of Q-switching device with improved properties.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the laser apparatus according to a first aspect of the present invention includes a laser resonator having at least a first reflective surface and a second reflective surface, wherein a laser medium is disposed in the light path of the light reflected from the first reflective surface and from the second reflective surface, and laser light is output from the above-mentioned second reflective surface. The laser apparatus is further equipped with a laser resonator loss-varying means capable of varying the loss of the above-mentioned laser resonator by producing a state that has a resonance frequency substantially coinciding with a frequency at which laser oscillation of the above-mentioned laser resonator is possible, and a state that has a resonance frequency different from all of the frequencies at which laser oscillation of the above-mentioned laser resonator is possible. Moreover, the laser resonator loss-varying means is installed in the light path of the light reflected from the first reflective surface and from the second reflective surface.

Thus, a laser apparatus that is capable of generating pulsed laser oscillation is obtained by installing a laser resonator varying means for producing at certain points in time the state that has a resonance frequency at which laser oscillation is possible, and for producing at other points in time the state that has a resonance frequency different from the frequencies at which laser oscillation is possible, in the light path of the light reflected from the first reflective surface and the second reflective surface forming the laser resonator.

In regard to the laser resonator loss-varying means, it is desirable to use an optical element that is capable of varying the loss of the laser resonator by producing two states: i.e., a state that has a resonance frequency at which laser oscillation of the laser resonator is possible, and a state that has another resonance frequency different from all of the frequencies at which laser oscillation of the laser resonator is possible. Furthermore, a state-varying means is provided for causing an alternate variation of the state of the optical element between the state that has a resonance frequency corresponding to the resonance frequency and the state that has a resonance frequency different from any of the resonance frequencies of the laser resonator. Using such a state-varying means to vary the state of the optical element which has a variable resonance frequency, it is possible to vary the loss of the laser resonator.

The optical element includes a crystal that exhibits an electrooptic effect. The state-varying means is a voltage supply means that supplies variable voltages to the optical element. By thus constructing the optical element using the crystal which exhibits the electrooptic effect, it is possible to vary the resonance frequency of the optical element by switching of the applied voltage. Since the direction of polarization of the incident light need not be varied by means of an electrooptic element as in a conventional Q-switching device using an electrooptic element and a polarizer, relatively low-voltage driving is possible. Furthermore, since the electrooptic element need not have a long length to cause a sufficient variation in the direction of polarization, only a small space is necessary for constructing the Q-switching device of the present invention.

Furthermore, the present invention is designed so that the loss of the laser resonator is small in the state in which the resonance frequency of the optical element coincides with a resonance frequency of the laser resonator, and that this loss becomes large in the state in which the resonance frequency of the optical element does not coincide with any of the resonance frequencies of the laser resonator. This way, the loss of the laser resonator is varied by matching the resonance frequency characteristics of the optical element with a resonance frequency of the laser resonator, or by deviating the resonance frequency of the optical element from the resonance frequencies of the laser resonator.

Furthermore, it is desirable that the crystal cut angle of the optical element be set such that the maximum electrooptic effect is obtained, and effects in the resonance frequency caused by changes in temperature on the optical element is minimized. Moreover, it is desirable that the crystal cut angle of the optical element be set such that the amount of variations in the resonance frequency of the optical element due to variations in the refractive index caused by changes in temperature in the optical element cancels the amount of variations in the resonance frequency due to variations in the volume caused by the same temperature changes. By setting the crystal cut angle of the optical element in such a way, it is possible to minimize the effects of variations in the resonance frequency characteristics of the optical element on the pulsed laser oscillation, even if the temperature changes.

Furthermore, the laser apparatus of the present invention is constructed such that the loss-varying means selects only a single frequency among the various frequencies at which laser oscillation is possible, as determined by the resonance frequencies of the laser resonator and the gain spectrum of the laser medium. By thus causing the resonance frequency in a certain state of the laser resonator loss varying means to coincide with only a single prescribed frequency among the frequencies at which laser oscillation is possible, it becomes possible to obtain single-frequency laser light.

In the present invention, it is desirable that the light-incident surface of the optical element be inclined so that a normal of the light-incident surface is angularly offset from the direction of the optical axis of the laser resonator.

By constructing a projection exposure apparatus including an illumination optical system having a plurality of the above-mentioned laser apparatuses for illuminating a mask with light emitted from the respective laser apparatuses, and a projection optical system for projecting the pattern on the mask onto a photosensitive substrate, it is possible to reduce undesirable speckle patterns, and there is no need to consider chromatic aberrations in the optical system. Accordingly, a high-performance exposure apparatus can be easily designed.

Furthermore, in the present invention, when the resonance frequency of the optical element differs from any of the frequencies at which laser oscillation of the laser resonator is possible, energy is accumulated inside the laser resonator. When the resonance frequency of the optical element is set at a frequency corresponding to at least one of the frequencies at which laser oscillation of the laser resonator is possible, the accumulated energy can be released from the laser resonator as a pulsed laser beam.

By thus installing a separate resonator in the laser resonator, and by repeatedly and alternately causing this resonator to have a resonance frequency corresponding to a resonance frequency of the laser resonator, it becomes possible to accomplish efficient pulsed laser oscillation.

In another aspect, the present invention provides a laser apparatus, including a laser resonator having a first reflective surface and a second reflective surface, the laser resonator further including a laser medium disposed between the first reflective surface and the second reflective surface for processing light reflected from the first and second reflective surfaces to output light to be resonated; and a resonator loss varying unit disposed between the first reflective surface and the second reflective surface of the laser resonator, the resonator loss varying unit being capable of switching a state thereof between a first state having a resonance frequency substantially coinciding with one of frequencies at which laser oscillation of the laser resonator is possible and a second state having the resonance frequency shifted to a value that is substantially different from any one of the frequencies at which laser oscillation of the laser resonator is possible to vary a loss of the laser resonator.

In another aspect, the present invention provides a projection exposure apparatus for projecting a mask pattern on a mask onto a substrate, the projection exposure apparatus including an illumination optical system including a plurality of laser apparatuses, for illuminating the mask with exposing light composed of light beams emitted from the respective laser apparatuses, each of the plurality of laser apparatuses including a laser resonator having a first reflective surface and a second reflective surface, the laser resonator further including a laser medium disposed between the first reflective surface and the second reflective surface for processing light reflected from the first and second reflective surfaces to output light to be resonated, and a resonator loss varying unit disposed between the first reflective surface and the second reflective surface of the laser resonator, the resonator loss varying unit being capable of switching a state thereof between a first state having a resonance frequency substantially coinciding with one of frequencies at which laser oscillation of the laser resonator is possible and a second state having the resonance frequency shifted to a value that is substantially different from any one of the frequencies at which laser oscillation of the laser resonator is possible to vary a loss of the laser resonator; and a projection optical system guiding the exposing light from the illumination optical system towards the substrate for projecting the mask pattern on the mask onto the substrate.

In another aspect, the present invention provides a method of causing pulsed laser oscillation using a first resonator having predetermined resonance frequencies and a second resonator installed within the first resonator and capable of changing its own resonance frequency, the method including the steps of (a) setting the resonance frequency of the second resonator to be substantially different from any of the resonance frequencies of the first resonator; (b) setting the resonance frequency of the second resonator to be substantially equal to at least one of the resonance frequencies of the first resonator to initiate laser oscillation; and (c) repeating steps (a) and (b) with a predetermined repetition rate to produce the pulsed laser oscillation having the predetermined repetition rate.

In a further aspect, the present invention provides a laser apparatus for generating pulsed laser oscillation from pumping light, including a laser resonator having a first reflective surface and a second reflective surface optically coupled to the first reflective surface to define an optical axis of the laser resonator, the laser resonator further including a laser medium disposed along the optical axis between the first reflective surface and the second reflective surface for processing the pumping light to output light to be resonated, the laser resonator having a plurality of resonance frequencies within the gain band at which laser oscillation is to occur; and a loss-varying optical element disposed along the optical axis of the laser resonator between the first reflective surface and the second reflective surface to transmit the light to be resonated, the loss-varying optical element being capable of periodically shifting a position of a peak in transmissivity of the loss-varying optical element between a first frequency substantially coinciding with one of the plurality of resonance frequencies of the laser resonator and a second frequency substantially different from any one of the resonance frequencies of the laser resonator to generate the pulsed laser oscillation.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 3A and 3B schematically illustrate the operation of the present invention: FIG. 3A shows the resonance frequency spectrum of the laser resonator and FIG. 3B shows the transmission light intensity spectrum of optical element 2;

FIGS. 4A and 4B illustrate the relationship between the variation in voltage applied to the optical element 2 through the power supply 3 and the emission of laser light from the laser apparatus according to the present invention;

DETAILED DESCRIPTION OF THE PREFERRED EMBODIMENTS

Reference will now be made in detail to the preferred embodiments of the present invention, examples of which are illustrated in the accompanying drawings.

First Preferred Embodiment

Figure 1:
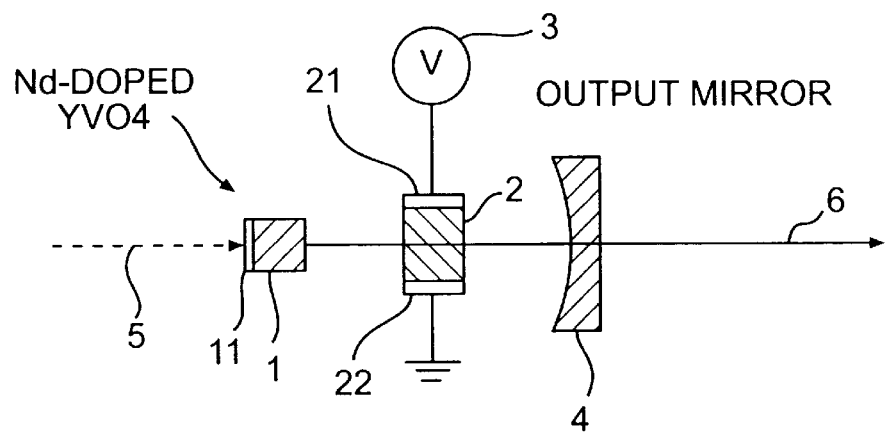
FIG. 1 schematically shows a laser apparatus according to a preferred embodiment of the present invention.

A laser apparatus according to a first preferred embodiment will be described with reference to FIG. 1. The laser apparatus of this embodiment generates pulsed laser oscillation. The laser apparatus includes a light source (not shown in the figures), such as semiconductor laser, for emitting pumping light 5 (wavelength: 809 nm, for example), and a laser medium 1 having a reflective film 11 on the incident surface on which the pumping light is incident. The laser apparatus further includes an optical element 2 made of a BBO ($BaB_2O_4$) crystal, a power supply 3 for applying voltages to the optical element 2, and an output mirror 4. The arrow 6 in FIG. 1 indicates an emitted laser beam.

Figure 2:
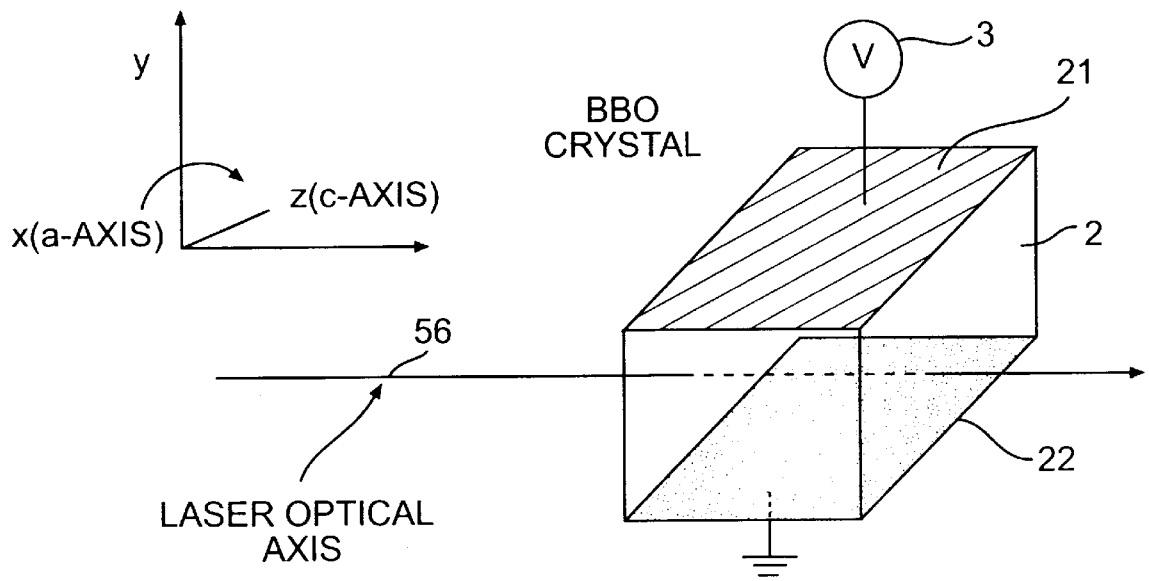
FIG. 2 shows the crystal orientation of an optical element with respect to the direction of the optical axis of the laser resonator of the laser apparatus according to a first preferred embodiment of the present invention.

The laser medium 1 is made of a $YVO_4$ crystal doped with neodymium (Nd). The optical element 2 is made of a crystal that exhibits the above-mentioned electrooptic effect, and is installed such that the z-axis (c-axis: one of the crystal axes) is oriented along the optical axis 56 of the laser resonator, as shown in FIG. 2. Electrodes 21 and 22 are disposed on opposing surfaces of the optical element 2 different from the incident and emission surfaces for light from the laser medium 1. The electrodes 21 and 22 are disposed in such a way as to generate an electric field in a direction parallel to the polarization direction of the light beam from the laser medium 1.

The reflective film 11 transmits the pumping light from the light source (not shown in the figures) and reflects light in the wavelength band corresponding to the light emitted from the laser medium 1. A laser resonator is constructed of the reflective film 11 and the output mirror 4.

In the present embodiment, a reflective film is coated on the laser-light-incident surface of the optical element 2, so that the light propagating through the optical element 2 undergoes multiple reflections between the incident and emission surfaces, which are the boundaries between the optical element 2 and the atmosphere. As a result, the optical element 2 has the same effect as a Fabry-Pérot resonator.

Furthermore, since the optical element 2 exhibits the above-mentioned electrooptic effect, the length of the optical path inside the optical element 2 changes depending on the voltage applied between the electrodes 21 and 22. The optical element 2 is designed such that its resonance frequency coincides with the resonance frequency of the laser resonator when a predetermined voltage is applied thereto, and such that the resonance frequency of the optical element 2 becomes significantly different from the resonance frequency of the laser resonator when no voltage is applied to the optical element.

The physical properties of the BBO crystal used above are shown in Table 1. The detailed information can be found in "Handbook of Nonlinear Optical Crystals" by V. G. Dmitriev, G. G. Gurzadyan, and D. N. Nikogosyan (Springer), for example.

TABLE 1

Physical constants of BBO crystal

| | |
|---|---|
| Electrooptic coefficient ($r_{22}$) | 2.5 pmV$^{-1}$ |
| Coefficient of linear expansion (a-axis) | 4 × 10$^{-6}$ K$^{-1}$ |
| Coefficient of linear expansion (c-axis) | 36 × 10$^{-6}$ K$^{-1}$ |
| Refractive index (for ordinary ray, 1064 nm) ($n_0$) | 1.6551 |
| Temperature variation of refractive index ($dn_0/dT$) | −16.6 × 10$^{-6}$ K$^{-1}$ |

Next, the relationship between this optical element 2 and the laser resonator will be described in more detail. FIGS. 3A and 3B show various spectra when the length of the laser resonator is 30 mm and the length of the optical element 2 is 6 mm. FIG. 3A shows resonance spectrum 34 (longitudinal mode) of the laser resonator for an oscillation wavelength of $\lambda=1.06$ $\mu$m, and gain spectrum 33 of the neodymium in the YVO$_4$ crystal of the laser medium 1. In FIG. 3A, the longitudinal modes 34 of the laser resonator are depicted together with the gain spectrum 33 of the neodymium in the YVO$_4$ crystal of the laser medium 1. The vertical axis indicates the gain, while the horizontal axis indicates the frequency of light. FIG. 3B shows resonance spectra 31 and 32 indicating the transmissivities at the optical element 2 as a function of the frequency of light. In FIG. 3B, the vertical axis indicates the transmissivity of the optical element 2, and the horizontal axis indicates the frequency of light.

In both FIGS. 3A and 3B, "0$\pi$" on the horizontal axis indicates the oscillation frequency of the laser apparatus of the present embodiment. Here, 0$\pi$ in FIG. 3A and 0$\pi$ in FIG. 3B indicates the same frequency, and 2$\pi$ in FIG. 3A and 2$\pi$ in FIG. 3B indicates the same frequency.

As shown in FIG. 3A, the gain width of Nd in the YVO$_4$ crystal is approximately 15 GHz., and the spacing of the longitudinal modes of the laser resonator is 5 GHz. Accordingly, with this configuration, laser oscillation is possible at three different frequencies.

In the laser apparatus of this embodiment, the optical element 2 having transmissivity characteristics such as that shown in FIG. 3B is installed between the reflective film 11 and the output mirror 4. In FIG. 3B, the transmissivity characteristics of the optical element 2 when a predetermined voltage is applied are indicated by solid line 31, and the transmissivity characteristics of the optical element 2 when no voltage is applied are indicated by dotted line 32.

As shown in FIG. 3B, when the predetermined voltage is applied to the optical element 2, the resonance frequency of the optical element 2 at which the transmissivity reaches its maximum coincides with one of the three oscillation frequencies at which laser oscillation is possible. Furthermore, any one frequency can be selected among these three frequencies by applying an appropriate voltage to the optical element 2.

On the other hand, as shown in FIG. 3B with the dotted line 32, when no voltage is applied, the resonance frequency does not coincide with any of the three frequencies at which oscillation is possible. In this condition, since the transmissivity of the optical element 2 is low for all of the longitudinal modes of the laser resonator, the loss inside the laser resonator becomes large, thereby hindering laser oscillation.

Since the optical element 2 has a high reflectivity, there is a possibility that Fabry-Pérot-type resonators may effectively be formed in the space between the light-incident surface of the optical element 2 and the reflective film 11 and/or in the space between the emission surface of the optical element 2 and the output mirror 4, generating undesirable oscillations. To eliminate such a possibility, the optical element 2 of the present embodiment is installed such that the light-incident surface and/or the emission surface is angularly offset from the optical axis of the laser resonator. As a result, light rays reflected from the optical element 2 are directed towards the outside of the laser resonator, thereby avoiding such undesirable oscillation.

The transmissivity of this optical element 2 is determined as follows. As described above, the optical element 2 functions as a Fabry-Pérot resonator. Therefore, the transmissivity of the optical element 2 is determined by a phase difference that is generated when the light incident on the optical element 2 makes a round trip in the optical element 2. The phase difference $\delta$ is represented by the following Equation (1).

$$\delta = (4\pi n_o l \cos \alpha)/\lambda = 2m\pi + \delta', \tag{1}$$

where $\delta'$ is the phase difference smaller than $2\pi$, $n_o$ is the refractive index of the optical element, l is the length of the optical element, a is the angle of refraction, $\lambda$ is the wavelength of the incident light, and m is an arbitrary integer representing the order of reflection.

In terms of the phase difference $\delta$, the transmissivity $I_t$ of the optical element 2 can be represented as follows.

$$I_t(R,\delta) = \frac{(1-R)^2}{1+R^2-2R\cos\delta}, \tag{2}$$

where R indicates the reflectivity at the light-incident surface and the emission surface of the optical element 2.

In Equation (2), the wavelength at which $I_t$ reaches its maximum gives the wavelength corresponding to the resonance frequency. Clearly, when $\delta'=0$ in Equation (1), the transmissivity $I_t$ reaches its maximum. Accordingly, the optical element 2 of the present embodiment is designed such that the $\delta$ value obtained from Equation (1) is an integral multiple of $2\pi$ when a predetermined voltage is applied.

In the laser apparatus of the present embodiment, it is necessary to set the spacing of the maximum values of the transmissivity of the optical element 2 (free spectral region) to be larger than the gain width of the laser medium 1 in order to obtain single-frequency laser light. The free spectral region ($\Delta\nu$) of the optical element 2 in terms of frequency can be derived from the conditions that the frequency corresponding to the maximum transmissivity can be derived by putting $\delta'=0$ in Equation (1), and that the difference in the order m between adjacent resonance frequencies is 1. The results are shown in Equation (3).

$$\Delta\nu = \frac{c}{2n_0 l \cos\alpha} \tag{3}$$

Here, $\Delta\nu$ is the spacing between resonance frequencies, and c is the velocity of light.

Accordingly, the length of the optical element 2 in this first preferred embodiment is designed to satisfy Δv>15 GHZ. Any length of the optical element that is shorter than 6.3 mm satisfies this condition in the present embodiment. Note that a requirement on the length of the optical element 2 is given by:

$$l < \text{Min}\left(\frac{c}{2n_0 v_G \cos\alpha}, lc\right),$$

where $v_G$ is the gain band width and lc is the length of the laser cavity. Furthermore, in the present embodiment, α is close to zero degree. An optical element 2 with a length of 6 mm or less was selected as an optical element satisfying these conditions.

The optical element 2 is designed such that the frequencies, at which maximum transmissivities occur, coincide with one of the longitudinal modes of the laser resonator. In a Fabry-Pérot resonator in general, as the reflectivity of the reflective surfaces increases, the transmission spectrum shows the following characteristic: only light at the peak frequencies (which yields an integral multiple of 2π in Equation (1)) or at the immediate vicinity thereof can be transmitted. This characteristic can be estimated in terms of "finesse" F given by Equation (4):

$$F = \frac{\pi\sqrt{R}}{1-R}, \tag{4}$$

where R is the reflectivity of the light-incident and emission surfaces of the optical element 2. The frequency width of the transmissivity characteristic curve narrows as the value of this "finesse" F increases.

In the optical element 2 used in this embodiment of the present invention, as described above, the above-mentioned features are intentionally used so that the Q value of the laser resonator is varied by shifting the resonance frequency of the optical element 2 by a small amount.

There are also systems in which the output mirror of the laser resonator is formed from a material that has an electrooptic effect, so that the output mirror itself functions as the Fabry-Pérot resonator. (See U.S. Pat. No. 5,381,431 and "Diode-pumped microchip lasers electro-optically Q switched at high pulse repetition rate", Optics Letters, Vol. 17, No. 17, Sep. 1, 1992, pp. 1201–1203,: J. J. Zayhowski and C. Dill III.) In this case, the Q value of the laser resonator is varied by varying the reflectivity of the output mirror. When such an output mirror is used, the transmissivity of the output mirror needs to reach its maximum with respect to all the frequencies at which laser oscillation is possible when the resonance frequency of the output mirror coincides with a resonance frequency of the laser resonator. In this case, the Q value of the laser resonator drops, and laser oscillation is suppressed. On the other hand, when the resonance frequency of the output mirror differs from any of the resonance frequencies of the laser resonator, the reflectivity of the output mirror is increased at frequencies at which laser oscillation is possible, and accordingly, pulsed laser light is output.

In this method, however, it is necessary to simultaneously increase the transmissivity of the output mirror at all the frequencies at which laser oscillation is possible, in order to efficiently reduce the Q value of the laser resonator. Accordingly, the optical path length of the laser resonator and the optical path length of an optical element used as the output mirror need to be the same. Accordingly, if this method is applied to a laser resonator of more than 1 cm in length, the manufacture of the optical element becomes difficult and the overall size of the laser apparatus increases. Furthermore, if single-mode laser light needs to be output by designing the gain width of the laser medium to be smaller than the free spectral region of the laser resonator, as in the present embodiment above, an additional equipment needs to be constructed, and the resultant laser apparatus becomes complicated. Moreover, miniaturization of the laser apparatus becomes difficult.

Next, the applied voltage required for driving the optical element 2 of the present embodiment will be described. The resonance frequency of the optical element 2 in the present embodiment is controlled by applying voltages. For example, the optical element 2 can be constructed such that when no voltage is applied, the transmissivity of the optical element 2 is sufficiently small at frequencies at which laser oscillation is possible. In this case, the applied voltage needs to be determined in such a way as to cause a sufficient shift of the resonance frequency.

For example, the applied voltage can be determined using the following Equation (5)

$$V = \frac{\lambda l_y}{2 l n_0^3 r_{22}} \frac{\Delta\delta}{2\pi}, \tag{5}$$

where $\Delta\delta$ is the phase difference corresponding to the shift in the resonance frequency of the optical element 2, V is the applied voltage, $\gamma_{22}$ is the electrooptic coefficient, and $l_y$ is the distance between the electrodes.

Equation (5) can always be used when a BBO crystal is installed inside the laser resonator in the arrangement shown in FIG. 2, as in the optical element 2 of the present embodiment.

It is preferable that in an exposure apparatus, approximately 100 of such laser apparatuses are lined up, and a laser light source formed by lining up these laser apparatuses is used as the light source of the projection exposure apparatus. In this case, it is preferable that the light beam from the respective laser apparatuses are emitted at shifted time intervals in order to reduce the coherence. For this reason, the oscillation interval of the pulsed laser oscillation in one laser apparatus is preferably set to approximately 10 kHz. Available power supplies capable of operating at 10 kHz have an output voltage of less than about 1 kV. Accordingly, in the laser apparatus of the present embodiment, the output of the power supply is set to 1 kV, and the distance $l_y$ between the electrodes was set to 3 mm.

The optical element 2 obtained using these conditions is as follows. The optical element 2 is designed such that the resonance frequency of the optical element 2 in transmission and one of the longitudinal modes of the laser resonator coincide with each other when the applied voltage is 1 kV. Therefore, the transmissivity $I_t$ of the optical element substantially becomes 1 when the applied voltage is 1 kV. Furthermore, assuming that the reflectivity R of the light-incident surface and the emission surface of the optical element 2 (with respect to light directed from the inside of the optical element 2 to the outside) is 0.83, then, when the applied voltage V is 0, Equation (5) gives δ=0.043×2π. In this case, the transmissivity $I_t$ (from Equation (2) is 0.328. With such a transmissivity, laser oscillation is suppressed, so that the exciting energy can be accumulated inside the laser medium 1.

Thus, in the laser apparatus of the present embodiment, driving of the optical element can be accomplished at a lower voltage than in a conventional EO-Q-switching device requiring driving voltages of several kilovolts.

Furthermore, in the present embodiment, multi-layer films are formed on the light-incident surface and emission surface of the optical element 2, thus increasing the reflectivity with respect to the light propagated through the optical element 2. Thus, the finesse F given by Equation (4) is increased.

However, if a substance with a high refractive index is used as the material of the optical element, a sufficient finesse F can be obtained even if reflective films are not formed on the light-incident surface and the emission surface of the optical element. Furthermore, if this finesse F is large, the variation in the resonance frequency of the optical element 2 required to vary the Q value of the laser resonator can be reduced. Accordingly, the driving voltage can be reduced by increasing the "finesse." FIG. 4A shows the voltage applied to the optical element 2, and FIG. 4B shows the intensity of the laser light emitted from the laser apparatus. Here, the horizontal axis t indicates time.

In the laser apparatus of this embodiment, as shown in FIGS. 4A and 4B, the applied voltage is 0 when no laser oscillation is to occur. A voltage is applied to the optical element 2 when laser oscillation is to occur. In actuality, the power supply 3 requires a time of a few nanoseconds (ns) in order to reach a prescribed voltage. Within this rising time, the voltage increases with time as shown in FIG. 4A. Consequently, the resonance frequency of the optical element 2 also changes. When the transmissivity substantially reaches its maximum value so that the loss inside the laser resonator becomes sufficiently small, laser oscillation begins after a time lag of approximately 1 ns. Even after laser oscillation begins, the power supply 3 maintains the prescribed voltage for a certain period of time as indicated by k in FIG. 4A. Then, the applied voltage returns to 0. Pulsed laser oscillation is accomplished by repeating such a voltage variation at a prescribed interval.

To initiate laser oscillation, the state in which the loss in the laser resonator is small needs to last only for a short period of time. For example, if the resonance frequency of the optical element 2 becomes sufficiently close to one of the longitudinal modes of the laser resonator during the rising time from the initial voltage 0 to the prescribed voltage, then the resonance frequency of the optical element 2 does not need to completely coincide with the longitudinal mode of the laser resonator when the applied voltage reaches the terminal prescribed voltage. In this case, in order to accomplish efficient laser oscillation without having too much loss in the laser resonator, it is sufficient that the rising time of the power supply be determined such that a state in which the transmissivity of the optical element 2 is sufficiently high (e.g., a state in which the transmissivity is 90% or greater) is maintained at least during emission of the pulsed laser beam. In the present embodiment, the transmissivity of the optical element 2 needs to be sufficiently high for a time interval of approximately 1 to 3 ns.

The resonance frequency of the optical element 2 varies according to temperature changes. The frequency fluctuation caused by temperature changes can be expressed by the following Equation (6).

$$\frac{d\delta}{dT} = 2\frac{2\pi}{\lambda}\left(\frac{dn_0}{dT}l + n_0\frac{dl}{dT}\right), \quad (6)$$

where $n_o$ indicates the refractive index of the optical element 2, and l indicates the length of the optical element 2.

If the length and the refractive index of the optical element 2 are given as described above, the value of $d\delta/dT$ is $0.485 \times 2\pi K^{-1}$. Furthermore, in the optical element 2 of the present embodiment, if temperature fluctuation $\Delta T$ is controlled to be within $\pm 0.02°$ C., the transmissivity $I_t$ of the optical element 2 will become equal to or greater than 0.903 when the prescribed voltage is applied to the optical element 2. Therefore, the loss in the laser resonator becomes sufficiently small, allowing efficient laser oscillation. On the other hand, when no voltage is applied to the optical element 2, the transmissivity $I_t$ becomes equal to or less than 0.45, so that a loss sufficient to suppress laser oscillation can be obtained. Accordingly, the resulting light source can handle temperature variation in a satisfactory manner, and is usable for a light source of a projection exposure apparatus and the like.

Second Preferred Embodiment

Next, a second preferred embodiment of the present invention will be described with reference to FIG. 5. The same or like components as the first preferred embodiment are labeled by the same reference numerals and the detailed explanations thereof are accordingly omitted.

A laser apparatus according to the second preferred embodiment of the present invention is designed to be less susceptible to temperature changes than the laser apparatus of the first preferred embodiment.

The refractive index $n_o$ and the length l of the optical element 2 changes due to temperature changes and the associated volume changes. The dependance of the fluctuations in the refractive index and in the length of the optical element 2 on the temperature changes is expressed in Equation (6) above.

In the laser apparatus of this embodiment, there is a special focus on this problem. The fact that the thermal expansion coefficient of the crystal used in the optical element 2 depends on the orientation of the crystal with respect to its crystal axes is utilized so that changes in the refractive index due to the temperature fluctuation can be canceled by effects due to the expansion coefficient of the optical element 2.

A BBO crystal is used in the optical element 2 having the desired electrooptic effect. The characteristics of this crystal with respect to variations in temperature are shown in Table 1 above. As seen from this Table 1, the BBO crystal shows different linear expansion coefficients for the a axis and the c axis, which are crystal orientations.

Accordingly, in the optical element 2 of the present embodiment, the orientation of the crystal-axis cut of the material having the electrooptic effect is determined in such a way as to maximize the electrooptic effect and to minimize the variation in the resonance frequency caused by the temperature fluctuation for the optical element 2. FIG. 5 shows an example of the thus constructed optical element 2. FIG. 5 also shows the positional relationship between the optical axis 56 of the laser resonator and the crystal axes of the optical element 2.

The direction in which the maximum electrooptic effect is obtained in the optical element 2 is the direction of the y axis, which is perpendicular to the a axis (one of the crystal axes). Accordingly, the electrodes 21 and 22 are installed such that an electric field is formed in the direction of the y axis. The laser medium 1 is disposed such that the polarization direction of the incident light is oriented in the direction of the y axis. Moreover, the optical element is arranged such that the c axis (another crystal axis) is inclined by an angle of $\theta$ relative to the optical axis 56 of the laser resonator. As a result of this arrangement, the linear expansion/contraction behavior of the optical element in response to temperature fluctuations can be expressed by the following Equation (7).

$$\frac{dl}{dT} = l(\alpha_a \sin^2\theta + \alpha_c \cos^2\theta), \tag{7}$$

where $\alpha_a$ indicates the linear expansion coefficient along the a axis, and $\alpha_c$ indicates the linear expansion coefficient along the c axis. Thus, the expansion coefficient varies according to the orientation of the crystal with respect to the optical axis.

Figure 5:
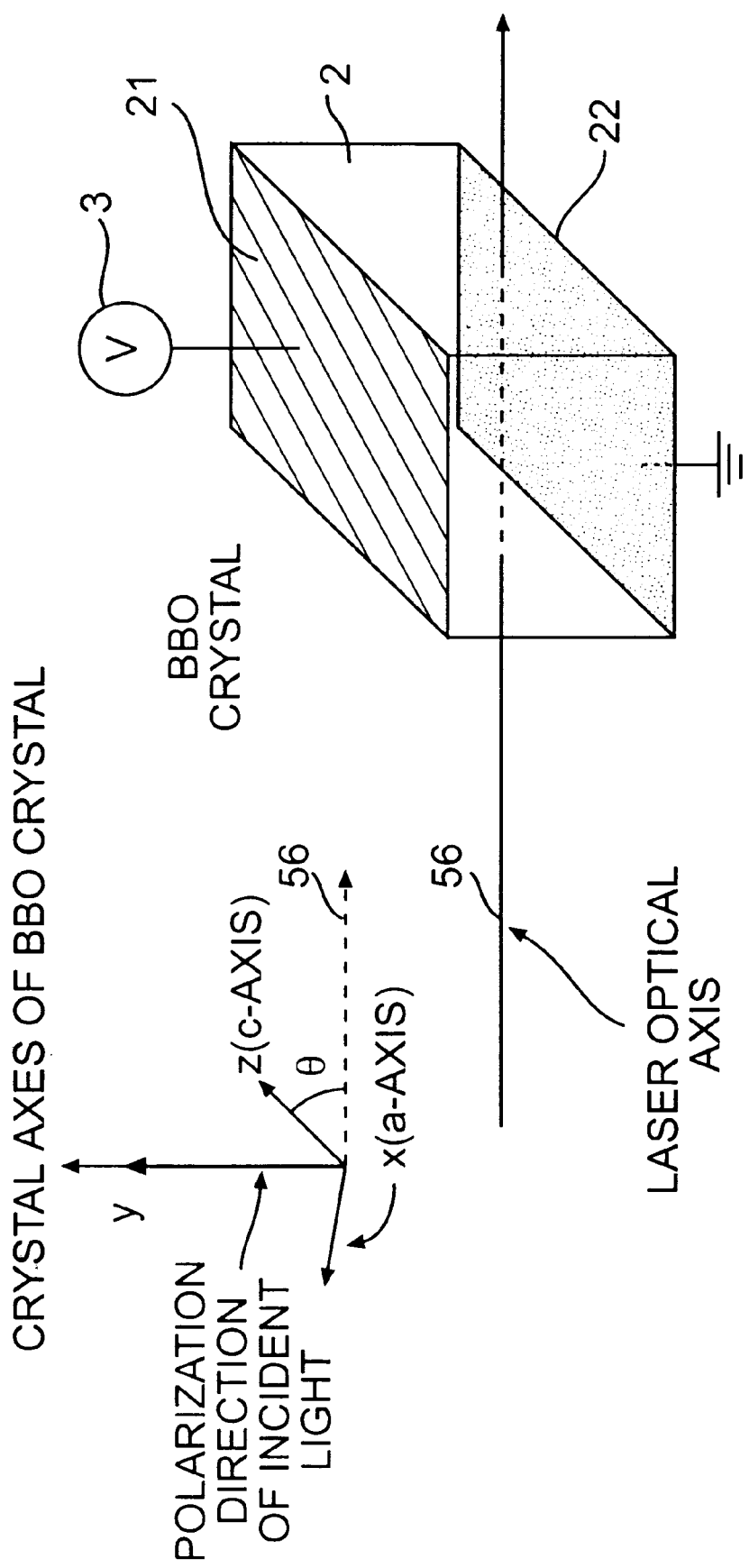
FIG. 5 shows the crystal orientation of an optical element relative to the optical axis of the laser resonator of the laser apparatus according to a second preferred embodiment of the present invention.

Furthermore, in Equation (6), the term $dn_o/dT$ depends on the direction of polarization of the incident light, but does not depend on the angle θ of the crystal-cut in the case of the arrangement of FIG. 5. Accordingly, the value of θ given by Equation (7), i.e., the orientation of the crystal-axis cut, is determined so that $d\delta/dT=0$ is satisfied in Equation (6).

This way, the effect of the linear expansion coefficient in the direction of the optical axis due to the temperature fluctuation and the variation in the refractive index due to the temperature fluctuation compensate for each other to suppress the variations of the resonance frequency of the optical element 2.

Furthermore, in the optical element 2 of the present embodiment, the electrooptic effect is determined by the direction of the applied voltage (y axis) and the polarization direction of the incident light (y axis). Accordingly, the desirable electrooptic effect can be obtained regardless of the angle θ of the crystal-cut (FIG. 5).

Next, the effect of this second preferred embodiment will be explained with reference to concrete examples of such an optical element 2 having a specific cut angle of the crystal θ.

When the optical element 2 is arranged so that θ=64.3±0.1, Equation (6) yields $d\delta/dT \leq -1.03 \times 10^{-3} \times 2\pi K^{-1}$. Therefore, stable operation is obtained in the range $\Delta T \leq 6.3°$ C. This confirms that the optical element 2 can be favorably operated over a wider range of temperature than the optical element of the first preferred embodiment.

Furthermore, by designing the system such that the variation in the resonance frequency due to temperature variations $(d\delta/dT)$, obtained by Equation (6), is larger than the above-mentioned value, but smaller than the value in the first preferred embodiment of the present invention, it is possible to adjust the resonance frequency of the optical element 2 to coincide with a longitudinal mode of the laser resonator by actively controlling the temperature.

For example, if the c axis is inclined by θ=66 degrees with respect to the optical axis of the laser resonator, Equation (6) yields $d\delta/dT=1.37 \times 10^{-2} \times 2\pi K^{-1}$. Therefore, the phase variation from $-\pi$ to $\pi$ in δ can be obtained by adjusting the temperature in the range of $\Delta T \leq \pm 12.1°$ C. In this case, temperature control within ±0.8° C. is necessary.

By thus appropriately selecting the cut angle of the crystal relative to the c axis in the optical element 2, it is possible to eliminate the effects of the temperature on the optical element 2. Conversely, as described above, by actively using temperature dependance of the resonance frequency, it becomes possible to obtain an optical element that can be set at the desired resonance frequency for Q-switching operation.

In the laser apparatuses of the first and second preferred embodiments, pulsed laser light was emitted when a voltage was applied to the optical element 2. However, the present invention is not limited to such an arrangement. It is possible to design the optical element 2 such that the resonance frequency of transmission of the optical element 2 coincides with a resonance frequency of the laser resonator when no voltage is applied, and such that the resonance frequency of the optical element 2 does not coincide with any of the resonance frequencies of the laser resonator when a predetermined voltage is applied. In such a case, pulsed laser oscillation occurs in the laser apparatus when no voltage is applied to the optical element 2.

Furthermore, a plurality of the laser apparatuses of the first or second preferred embodiment, lined up together, as well as a single unit of the laser apparatus can used as a light source.

Next, a case that the above-mentioned laser apparatuses are used as a light source for a projection exposure apparatus will be described. Light in the ultraviolet region is required as the light source for a projection exposure apparatus. For example, it is possible to obtain the ultraviolet light for the exposure apparatus using an alexandrite crystal ($Cr:BeAl_2O_4$) as the laser medium 1, and guiding the light from the laser resonator to a nonlinear optical crystal to perform a wavelength conversion. The nonlinear optical crystals that can be used in this case are an LBO crystal ($LiB_3O_5$), which converts light with a wavelength of 772 nm emitted from the alexandrite crystal laser medium 1 into light with a wavelength of 386 nm, and an SBBO crystal ($Sr_2Be_2B_2O_7$), which converts the light with a wavelength of 386 nm emitted from the LBO crystal into light with a wavelength of 193 nm. Alternatively, it is possible to use two BBO crystals instead of using the SBBO crystal in the above construction to generate light with a wavelength of 193 nm, as follows. First, a sum frequency generation is accomplished through the first BBO crystal by processing light with a wavelength of 386 nm and light with a wavelength of 772 nm to yield light with a wavelength of 257 nm. Then, another sum frequency generation is accomplished through the second BBO crystal by processing the thus produced light with a wavelength of 257 nm and light with a wavelength of 772 nm to produce light with a wavelength of 193 nm.

Furthermore, it is also possible to use a glass doped with erbium (Er) as the laser medium 1. In this case, laser light with a wavelength of 1542 nm is emitted from the laser medium 1 and subjected to a wavelength conversion through nonlinear optical crystals. The nonlinear optical crystals that can be used here are a KTP crystal, which converts light with a wavelength of 1542 nm into light with a wavelength of 772 nm, an LBO crystal, which converts the thus generated light with a wavelength of 772 nm into light with a wavelength of 386 nm, and an SBBO crystal, which converts the thus generated light with a wavelength of 386 nm into light with a wavelength of 193 nm. Alternatively, it is possible to obtain the light with a wavelength of 193 nm by using two BBO crystals instead of the SBBO crystal in the above construction, as follows. First, a sum frequency is generated through the first BBO crystal by processing the light with a wavelength of 386 nm and the light with a wavelength of 772 nm to emit light with a wavelength of 257 nm. Then, another sum frequency is generated through the second BBO crystal by processing the thus generated light with a wavelength of 257 nm and the light with a wavelength of 772 nm to generate light with a wavelength of 193 nm.

As described above, in the present embodiment, light with a wavelength of 193 nm can be obtained by installing nonlinear optical crystals in the laser apparatus.

Desired characteristics as a light source for a projection exposure apparatus include the following: a narrow wavelength band for light emitted from the light source; low coherence of the emitted light; and a strong intensity of the emitted light. In the present embodiment, 100 of the laser apparatuses described above are lined up to form the light source for the projection exposure apparatus. Furthermore, the above-mentioned nonlinear optical crystals are installed on the emission sides of the respective laser apparatuses, so that ultraviolet laser beams with a wavelength of 193 nm are emitted. The resultant light emitted from the light source has a low coherence. Also, since the above-mentioned optical element 2 is used in each of the laser apparatuses, single-frequency (monochromatic) laser light is obtained.

Accordingly, the resonance frequencies of the respective optical elements 2, and the resonance frequencies of the laser resonators closest to these frequencies, can be kept within the desired wavelength band. Furthermore, even though the light intensity of each of the laser light sources respectively constructed of a single laser apparatus and a single nonlinear optical crystal is small, a total light intensity can be made sufficiently strong for illuminating the mask by guiding the light beams emitted from the respective laser apparatuses into a common illumination optical system.

Figure 6:
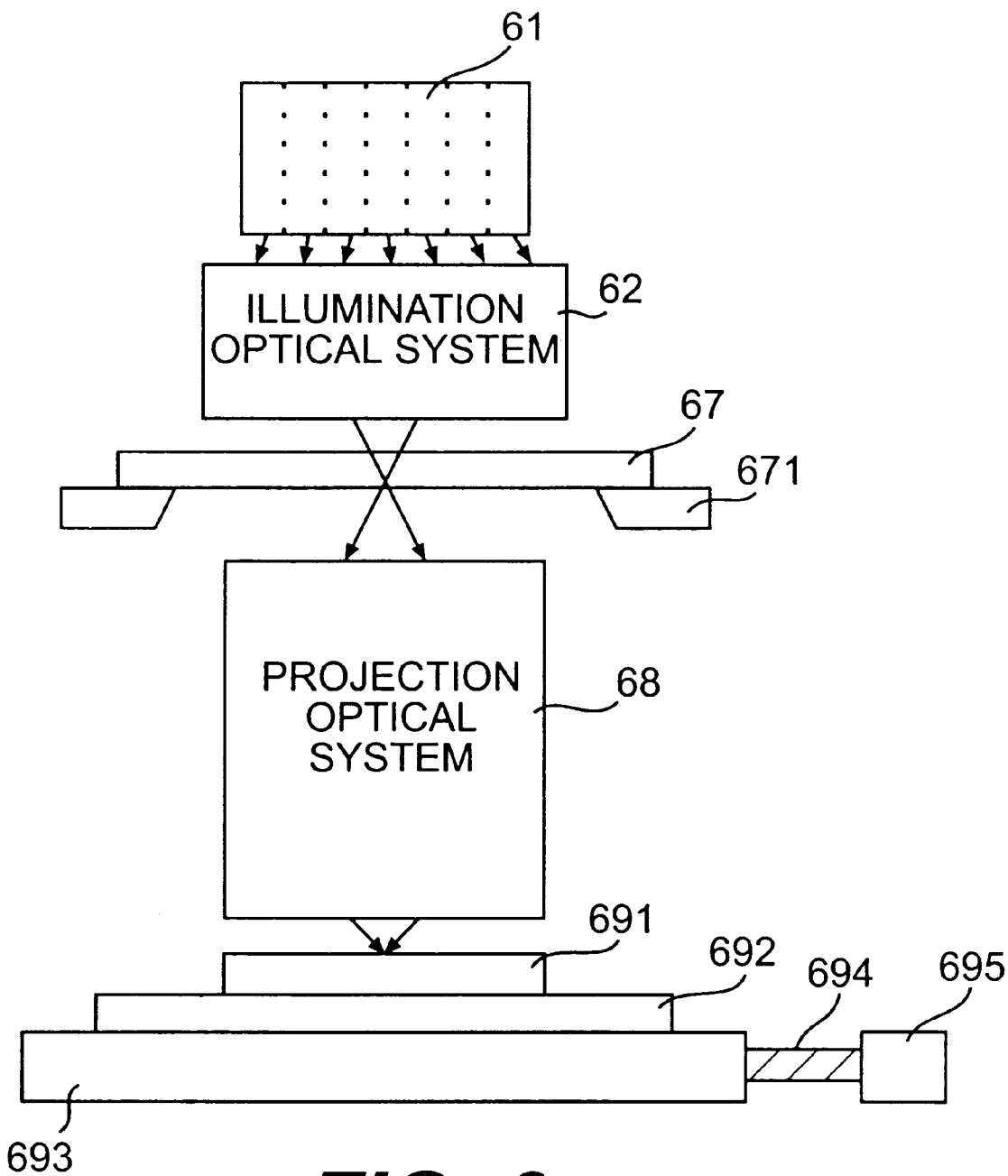
FIG. 6 schematically shows a projection exposure apparatus according to a preferred embodiment of the present invention.
Figure 7:
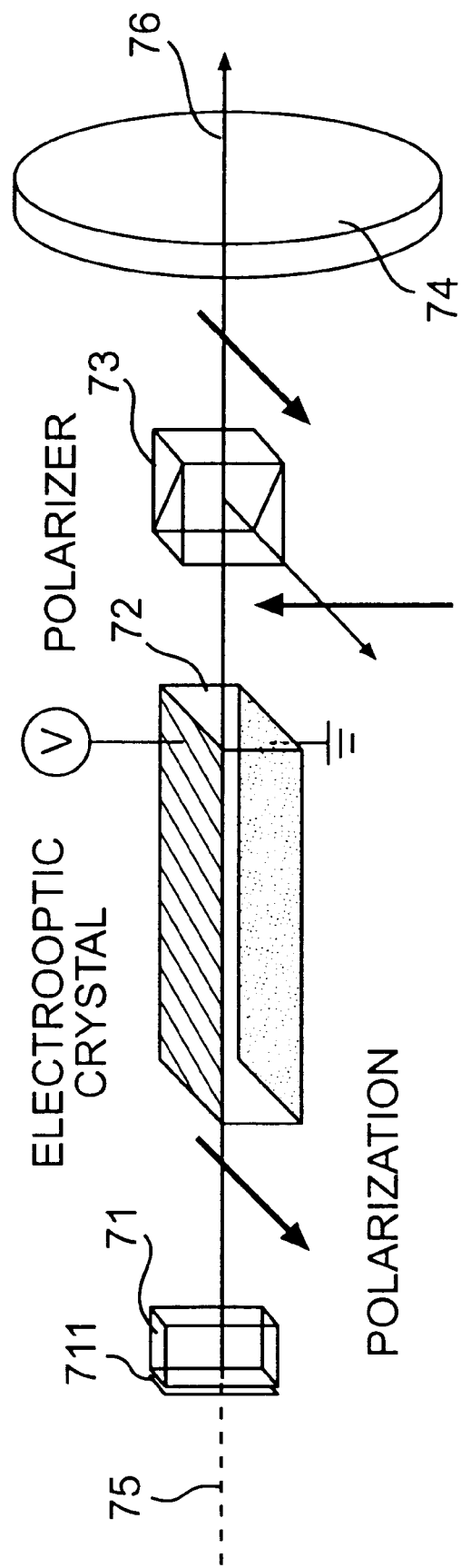
FIG. 7 schematically shows a conventional pulsed laser apparatus.

FIG. 6 shows an example of such a projection exposure apparatus. This projection exposure apparatus includes a laser light source 61 constructed of a plurality of laser apparatuses and nonlinear optical crystals, an illumination optical system 62 for illuminating a mask 67 at a uniform intensity with the light emitted from the laser light source 61, a mask support 671 for holding the mask 67 having an exposure pattern thereon, a projection optical system 68 for focusing the image of the pattern on the mask 67 onto a semiconductor substrate 691 (wafer or the like), and a movable stage 692 for holding the substrate 691.

The movable stage 692 can be moved through a moving stage supporting part 693 for supporting the movable stage 692, a stage driving part 695 for driving the movable stage 692, and a transmission member 694 for transmitting a driving force generated by the stage driving part 695 to the moving stage supporting part 693.

The circuit pattern on the mask 67 is reduced and projected onto the semiconductor substrate 691 at a predetermined projection ratio (1× to ⅕×, for example) by the projection optical system 68. The substrate 691 is held on the moving stage 692, and is subjected to successive exposure processes in which portions of the substrate are exposed successively with the stage being moved to the respective exposure positions (step-and-repeat exposure). Alternatively, it is possible to perform a scanning exposure by providing a moving mechanism for moving the mask 67 for the mask supporting part 671, and by synchronously moving the mask 67 and the substrate 691 during exposure.

In the present invention, as described above, a laser apparatus which is capable of high-speed pulsed laser oscillation can be obtained without extra optical parts such as a polarizer, etc. The laser apparatus of the present invention further has advantages that this laser apparatus does not require a high-voltage power supply, and the laser apparatus itself can be made compact.

It will be apparent to those skilled in the art that various modifications and variations can be made in the laser apparatus, pulsed laser oscillation method and the projection exposure apparatus using the same of the present invention without departing from the spirit or scope of the invention. Thus, it is intended that the present invention cover the modifications and variations of this invention provided they come within the scope of the appended claims and their equivalents.

What is claimed is:

1. A laser apparatus, comprising:
    a laser resonator including a first reflective surface, a second reflective surface, and a laser medium pumped to produce laser light at a laser oscillation frequency;
    a voltage supply for generating a first voltage and a second voltage; and
    an electrooptic crystal disposed within the laser resonator and connected to the voltage supply such that the electrooptic crystal has a first refractive index when the first voltage is applied to the electrooptic crystal and has a second refractive index when the second voltage is applied to the electrooptic crystal, the electrooptic crystal including two partially reflective surfaces opposing to each other to define a second resonating cavity with a first resonance frequency substantially coinciding to the laser oscillation frequency when the electrooptic crystal has the first refractive index, and a second resonance frequency shifted to a value that is substantially different from the laser oscillation frequency to turn the laser light off when the electrooptic crystal has the second refractive index.

2. The laser apparatus according to claim 1, wherein a normal of a light-incident surface of the electrooptic crystal is angularly offset from an optical axis of the laser resonator.

3. The laser apparatus according to claim 1, wherein the orientation of a crystal cut angle of the electrooptic crystal is set so as to substantially maximize an electrooptic effect of the electrooptic crystal and to substantially minimize variations in the first and second resonance frequencies of the second resonating cavity due to temperature changes.

4. The laser apparatus according to claim 1, wherein the electrooptic crystal is anisotropic in its linear thermal expansion coefficient and substantially isotropic in its refractive index, and the orientation of a crystal cut angle of the electrooptic crystal is set such that variations in the first and second resonance frequencies of the second resonating cavity that are caused by changes in refractive index of the electrooptic crystal due to temperature changes substantially offset variations in the first and second resonance frequencies of the second resonating cavity that are caused by changes in volume of the electrooptic crystal due to the temperature changes.

5. The laser apparatus according to claim 1, wherein, the second resonating cavity is a Febry-Pérot resonator.

6. The laser apparatus according to claim 1, wherein the electrooptic crystal is a BBO crystal having an a-axis and a c-axis as crystal axes thereof, wherein laser light is lineally polarized in a predetermined polarization direction normal to an optical axis of the laser resonator, and the direction of electric fields generated in the BBO crystal by the first and second voltages applied to the electrooptic crystal is parallel to the predetermined polarization direction.

7. The laser apparatus according to claim 6, wherein a plane defined by the a-axis and the c-axis of the BBO crystal is substantially perpendicular to the polarization direction of the laser light.

8. The laser apparatus according to claim 7, wherein the orientation of the a-axis and the c-axis of the BBO crystal is set such that variations in the first and second resonance frequencies of the second resonating cavity that are caused by changes in refractive index of the BBO crystal due to temperature changes substantially offset variations in the first and second resonance frequencies of the second resonating cavity that are caused by changes in volume of the BBO crystal due to the temperature changes.

9. The laser apparatus according to claim 1, wherein the voltage supply generates a periodically varying voltage that includes the first and second voltages to produce a periodic pulsed laser.

10. A projection exposure apparatus for projecting an image of a mask pattern on a mask onto a substrate, the projection exposure apparatus comprising:

a mask holder for holding the mask;

an illumination optical system including a plurality of laser apparatuses, for illuminating the mask with exposing light composed of light beams emitted from the respective laser apparatuses, each of the plurality of laser apparatuses including:

a laser resonator including a first reflective surface, a second reflective surface, and a laser medium pumped to produce laser light at a laser oscillation frequency, a voltage supply for generating a first voltage and a second voltage, and an electrooptic crystal disposed within the laser resonator and connected to the voltage supply such that the electrooptic crystal has a first refractive index when the first voltage is applied to the electrooptic crystal and has a second refractive index when the second voltage is applied to the electrooptic crystal, the electrooptic crystal including two partially reflective surfaces opposing to each other to define a second resonating cavity with a first resonance frequency substantially coinciding to the laser oscillation frequency when the electrooptic crystal has the first refractive index, and a second resonance frequency shifted to a value that is substantially different from the laser oscillation frequency to turn the laser light off when the electrooptic crystal has the second refractive index;

a substrate holder for holding the substrate; and a projection optical system guiding the exposing light that has interacted with the mask towards the substrate to project the image of the mask pattern on the mask onto the substrate.

11. The projection exposure apparatus according to claim 10, wherein in each of the plurality of laser apparatuses, the orientation of a crystal cut angle of the electrooptic crystal is set so as to substantially maximize an electrooptic effect of the electrooptic crystal and to substantially minimize variations in the first and second resonance frequencies of the second resonating cavity due to temperature changes.

12. The projection exposure apparatus according to claim 10, wherein in each of the plurality of laser apparatuses, the electrooptic crystal is anisotropic in its linear thermal expansion coefficient and substantially isotropic in its refractive index, and the orientation of a crystal cut angle of the electrooptic crystal is set such that variations in the first and second resonance frequencies of the second resonating cavity that are caused by changes in refractive index of the electrooptic crystal due to temperature changes substantially offset variations in the first and second resonance frequencies of the second resonating cavity that are caused by changes in volume of the electrooptic crystal due to the temperature changes.

13. The projection exposure apparatus according to claim 10, wherein in each of the plurality of laser apparatuses, the second resonating cavity is a Febry-Pérot resonator.

14. The laser apparatus according to claim 10, wherein in each of the plurality of laser apparatuses, the voltage supply generates a periodically varying voltage that includes the first and second voltages to produce a periodic pulsed laser.

* * * * *